Patented June 5, 1934

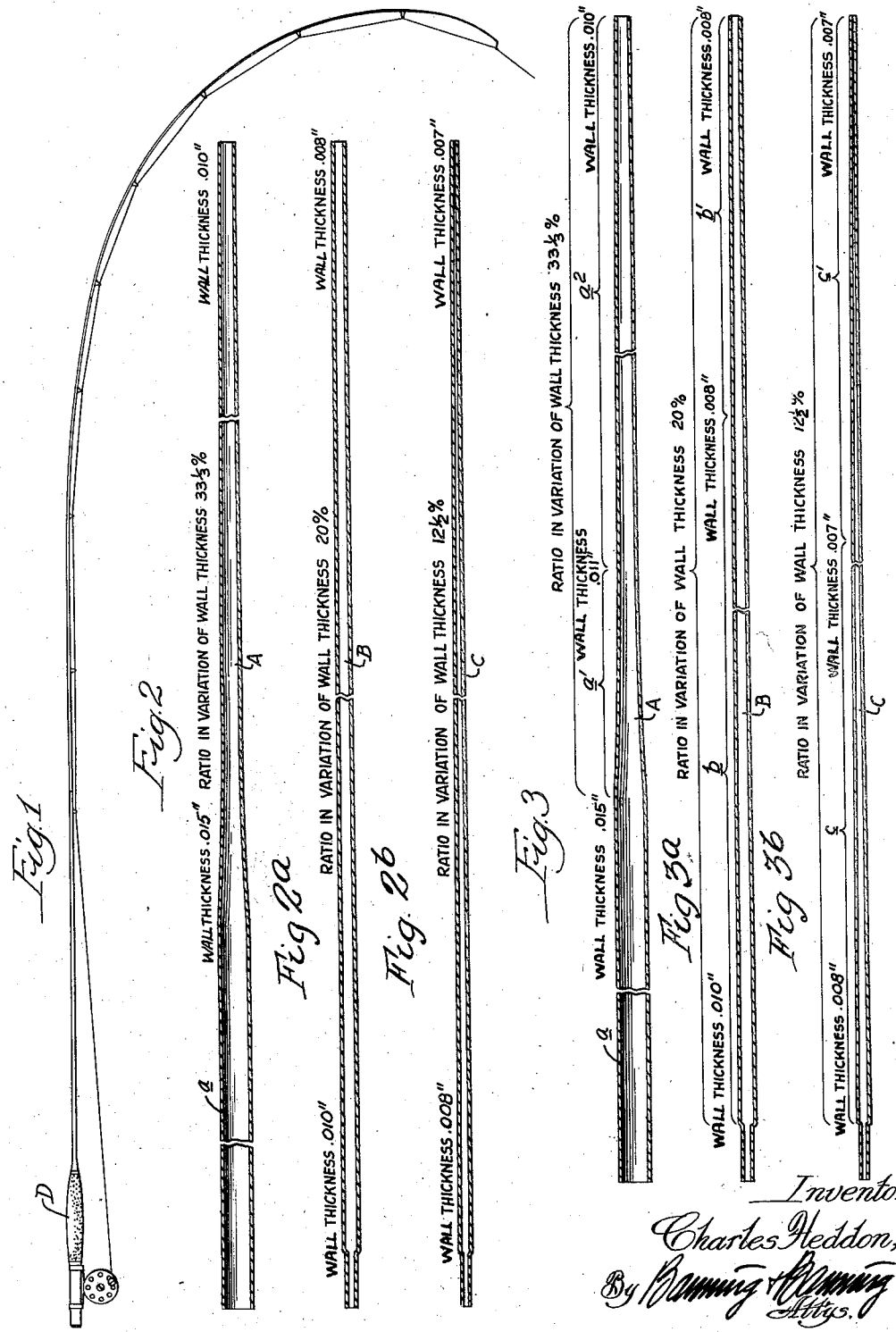

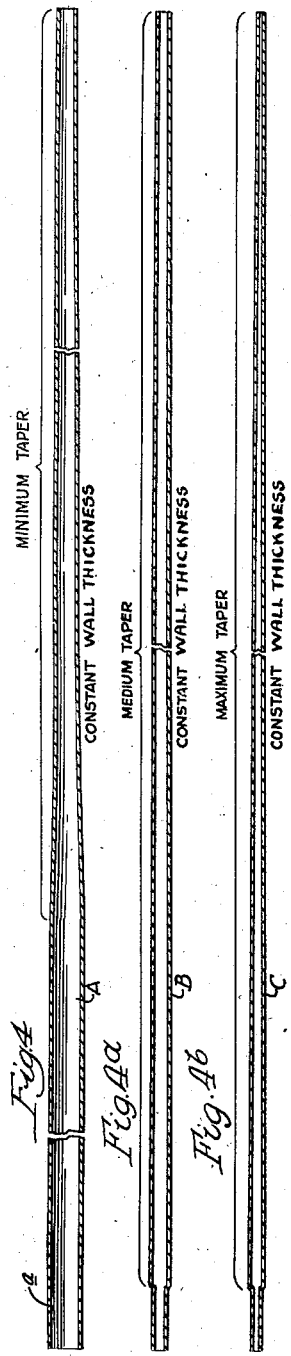
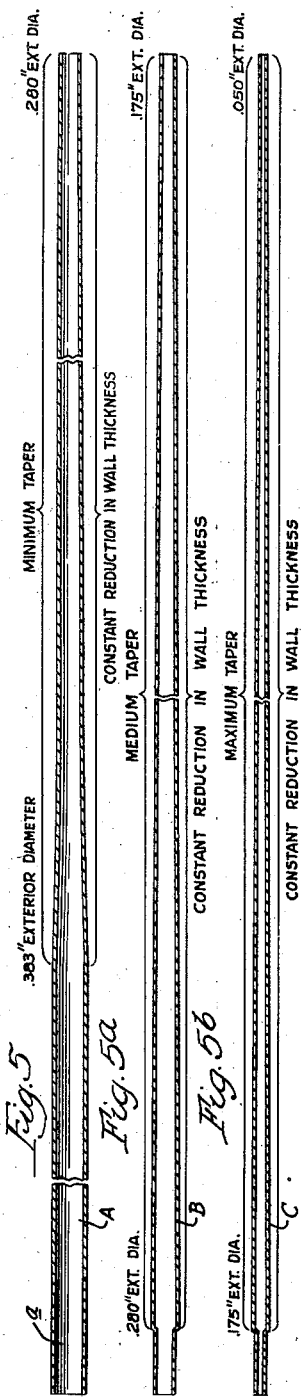
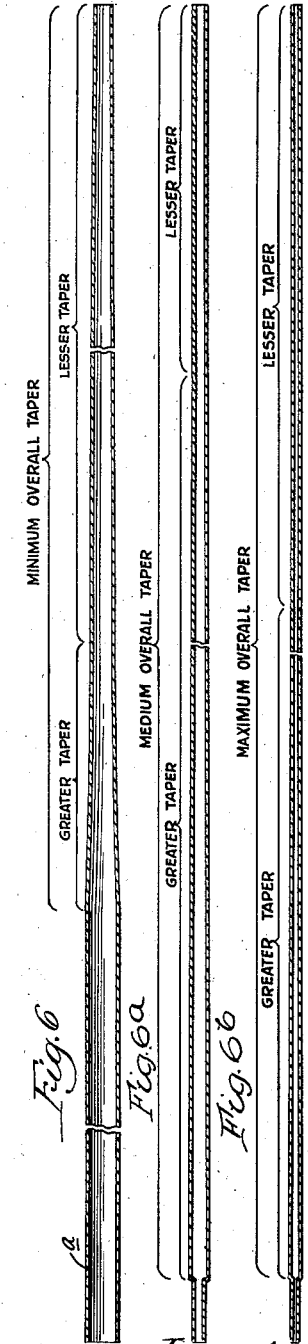

UNITED STATES PATENT OFFICE 1,961,969

METALLIC FISHING ROD

Charles Heddon, Dowagiac, Mich., assignor to James Heddon's Sons, Dowagiac, Mich., a corporation of Michigan Application February 15, 1933, Serial No. 656,890

8 Claims. (Cl. 43—18)

This invention is directed to a tubular metallic fishing rod preferably but not necessarily of drawn seamless steel or other suitable metal, which is so designed as to distribute the weight, flexibility and strength in conformity with requirements which are predetermined with reference to the service for which the rod is intended and with reference to the preferences of individual fishermen in respect to the above characteristics. In the case of steel rods as now manufactured, the element of strength and durability is frequently present, but adequate strength is often secured at the sacrifice of lightness and a desirable distribution of weight and flexibility throughout various regions in the rod.

The present invention is directed to a proper correlation of the factors of taper and wall thickness, with a view of securing adequate strength, lightness and durability, and weight distribution, without sacrifice of other qualities which are present in the finest split bamboo fishing rods as now manufactured.

The present invention is primarily directed to fly rods in which the requirement for lightness and flexibility has heretofore precluded the use of metal as a substitute for split bamboo, but fly rods constructed in accordance with the present invention are found to be equal in all respects to the finest split bamboo fly rods, as regards the matter of lightness and distribution of weight and flexibility, and superior thereto in the elements of strength and durability.

Although the invention is peculiarly adapted to the requirements of a jointed fly rod, the principles to be described are applicable to the construction of bait casting, salt water fishing, or other rods, and although tempered steel is the material commonly employed in constructing the rod, it is not the intention to limit the invention to the use of that metal, since alloys of various metals are available which possess characteristics well adapting them for use in the manufacture of the rod of the present invention.

Further objects and details will appear from a description of the invention, in conjunction with the accompanying drawings, wherein,—

Figure 1 is a side elevation of a jointed fly rod embodying the features of the present invention;

Figs. 2, 2ª and 2ᵇ comprise a composite view showing the three metallic sections of the rod and displaying the principle of differing ratios of variation in wall thickness of the respective sections and in which a constant ratio of variation is retained throughout each section, save for the swell toward the butt end;

Figs. 3, 3ª and 3ᵇ comprise a modification in which the ratio in wall thickness differs in each of the sections as compared with the others, but which displays a differing variation in ratio within different portions of the same rod section;

Figs. 4, 4ª and 4ᵇ comprise a modification in which the wall thickness throughout the rod remains constant, with variations in the degree of taper in the different sections as compared with one another;

Figs. 5, 5ª and 5ᵇ comprise a modification in which a constant ratio of reduction in wall thickness obtains from end to end of the rod, combined with a variable taper in the respective sections; and Figs. 6, 6ª and 6ᵇ comprise a modification in which either a constant or a variable wall thickness throughout the rod is combined with varying degrees of taper in different portions of the respective sections.

The rod of the present invention differs essentially from solid steel rods and wooden rods of split bamboo or the like, in that the present rod is constructed of tubing preferably of drawn metal, so that it provides a hole or bore extending throughout the rod, and this circumstance permits of suitable variations both in wall thickness and in external taper, and in the combination of these variable factors, with the result that by proper designing and distribution of the elements of external taper and wall thickness throughout various regions in the rod, it is possible to design the rod in such a way as to most advantageously distribute the flexibility, strength and weight to meet the intended requirements and to give to the rod the proper characteristics required by discriminating users of fine fishing rods.

Particularly in the designing of rods for dry fly casting, it is essential to afford extreme flexibility throughout the outer third of the rod, combined with adequate strength and stiffness toward the butt end of the rod, and the principles of the present invention enable these results to be attained in the degree necessary to bring the tip into fast motion, causing quick recovery of the entire rod and bringing it back to a stationary position rapidly after delivering the cast.

In the construction of fly rods for wet casting, it is desirable to have the entire rod more limber or supple throughout, and this can be accomplished in accordance with the principles of the present invention by more uniformly distributing the taper throughout the rod and combining a moderately flexible tip section with a butt section which is lighter in comparison and smaller in diameter than in the case of a dry casting rod.

In the case of bait casting rods, it is desirable ordinarily to afford a greater measure of stiffness in the tip region and lesser flexibility throughout than in the case of fly rods, and likewise the principles of the present invention are applicable to meet such requirements.

Fig. 1 and Figs. 2, 2a and 2b show a fishing rod comprising three sections, A, B, C, which may be conveniently referred to as the butt section, the middle section, and the tip section. The butt section A, as shown, is extended through a handle D of the usual character, and as illustrated the butt section with the handle attached is of uniform length with the middle section B and the tip section C, although it is not the intention to limit the invention to a rod in which the butt section is permanently formed with the handle, since the butt section, exclusive of the handle, might be made of equal length with the remaining two sections.

As shown, the butt section terminates in a portion $a$ which is of cylindrical formation and relatively short length, to receive the handle grip and reel seat, and beyond the portion $a$, the rod, throughout the sections A, B, C, is uniformly tapered, but of varying wall thickness from the butt to the tip.

In the case shown, the wall thickness varies from .015 in. at the handle end of the butt section to a thickness of .007 in. at the tip, so that in this instance the reduction in external diameter concurs with a reduction in wall thickness, but the ratio of such reduction in wall thickness is variable in the different sections.

In the butt section, the wall thickness at the handle end is .015 in., and this reduces to a thickness of .010 in., which is a ratio in variation of wall thickness of 33⅓% throughout the butt section of the rod.

The middle section varies in wall thickness from .010 in. at the inner end to .008 in. at the outer end, which is a ratio in variation of wall thickness of 20%.

The thickness of the tip section at the inner end is .008 in. and at the outer end .007 in., being a ratio in variation of wall thickness of 12½%.

In other words the ratio of variation of wall thickness equals the difference in wall thickness at each end of one section divided by the wall thickness at the thickest end of that section.

It appears from the above description that the different sections of the rod display a progressive decrease in wall thickness, but according to differing ratios of diminution in thickness in the different sections of the rod. The ratio of decrease, however, in any given section remains constant throughout the entire section.

In Figs. 3, 3a and 3b the characteristics last described are subject to further modification, in that in the butt section, although the ratio of diminution in wall thickness from end to end is 33⅓%, the diminution in thickness is not by a constant ratio but by different ratios in different portions of the butt section of the rod. Thus in the region $a'$ the diminution is from .015 in. to .011 in., while in the region $a^2$ the diminution in thickness is from .011 in. to .010 in., from which it will be understood that the major portion of the diminution in wall thickness is centered in the inner end region of the butt section of the rod, and that the outer end region of the section maintains an almost constant wall thickness.

Similarly, in the middle section B, although the overall ratio of diminution in wall thickness is 20%, as in the case of the middle section in Fig. 2a, nevertheless, in Fig. 3a, the diminution in wall thickness is entirely confined to the inner region $b$, while the outer region $b'$ maintains constant uniformity in wall thickness at .008 in.

In the tip section, although the overall ratio of diminution in wall thickness is 12½%, this variation is confined to the inner region $c$, which decreases in thickness from .008 to .007 in., while the outer region $c'$ of the tip section retains a constant thickness of .007 in.

By maintaining the minimum wall thickness throughout a considerable region backwardly from the extreme tip, the inertia of that portion of the rod will be reduced, while the inner end region of the tip section, within which the diminution in wall thickness is mainly localized, will be relatively heavier as compared with a rod like that shown in Fig. 2b, in which the ratio of variation in wall thickness remains constant throughout the entire tip section. Likewise, by centering the ratio of variation of the middle section within the inner region thereof, or any other selected region of the rod, the desired distribution of weight and strength can be secured in each portion of the rod, so that its strength and balance as a whole will be correspondingly varied to meet the requirements for service.

In Figs. 4, 4a and 4b variations in flexibility within the intended regions of the rod as a whole is attained by varying the exterior taper of the different sections without varying the wall thickness. In this instance, a minimum taper is found in the butt section A, a medium taper in the middle section B, and a maximum taper in the tip section C. By thus centering minimum diameter in the extreme tip region, a maximum of flexibility will be centered in the extreme tip as required in dry fly casting, while the middle and butt sections will be correspondingly relatively stiffened as compared with a similar rod of uniform taper throughout.

In Figs. 5, 5a and 5b is shown a typical form of construction in which there is a constant, or substantially constant, ratio in reduction of wall thickness from end to end of the rod and distributed throughout the three sections, and concurrently therewith there is a variable exterior taper from end to end of the rod, which is at a minimum in the butt section (.383 in. to .280 in.), at medium taper in the middle section (.280 in. to .175 in.), and at a maximum in the tip section (.175 in. to .050 in.). In this instance, the flexibility of the rod will vary throughout in conformity with a variable factor of taper, and the weight and strength will vary throughout in conformity with a constant, or substantially constant, ratio of reduction in wall thickness, giving a rod of extreme lightness as well as flexibility in the tip.

In Figs. 6, 6a and 6b is shown a rod in which the wall thickness may be maintained constant or variable throughout, but in which the taper varies within different regions of the different sections. That is to say, the overall taper of the butt section will be at a minimum, the middle section will display a medium overall taper, and the tip section will display a maximum overall taper. However, within one or more of the sections, the taper will vary in different regions, which have been designated by the captions "greater taper" and "lesser taper."

The effect of this distribution in the taper is to afford a progressive increase in taper from the inner butt end to the outer tip end, so that the outer tip region of the rod is most rapidly tapered with increasing flexibility in that region. The variations in taper set forth in Figs. 6, 6ª and 6ᵇ may, if desired, be combined with either a constant or variable diminution in ratio of wall thickness, so that a maximum flexibility combined with extreme lightness in the tip region of the rod will be attained where throughout a considerable extent backwardly from the extreme tip the rod combines both a minimum of wall thickness and a maximum of taper, or in other words, a construction in which these two factors combine to reduce the stiffness and weight of the rod in the extreme tip region to the utmost degree compatible with adequate strength and durability, and to give to the tip of the rod a whip-like character.

From the above description, it will be apparent that the present invention contemplates numerous variations in the two factors of wall thickness and taper, which may be varied either separately or in desired combinations with one another, so that each section of the rod, as a component of the entire rod, may be designed with due regard to the action desired, and with a proper distribution of the weight, flexibility and strength in any desired ratio. By maintaining substantial uniformity in minimum wall thickness, and by increasing the taper throughout the outer region of the rod, and by centering the maximum of thickness and moderate taper within the inner region of the rod, it is possible to design a rod of extreme flexibility and lightness in the tip section, such as may be desired for light dry fly casting, and to thereby give the necessary quick recovery with a minimum of weight and consequent inertia in conformity with the requirements for high grade rods of this character. Similarly, by rendering the rod more limber or supple in the butt section, and relatively stiffer and heavier in the tip section, the action will be more uniformly distributed throughout the entire rod, as required in the case of a fly rod for wet fly casting.

On the other hand, by maintaining uniformity in wall thickness and substantial uniformity in taper throughout, a rod of much stiffer character can be produced, and by the use of high quality steel which is properly tempered, it is possible to produce in one and the same rod, all of the desirable characteristics of strength, durability, flexibility, balance and weight, in the highest possible degree. A rod properly designed in conformity with the principles of the present invention will, therefore, possess the best characteristics of a high grade split bamboo rod combined with the best characteristics of steel rods as heretofore constructed, and these results may, if desired, be attained in rods of lesser weight than it has heretofore been possible to secure in high grade fishing rods.

Although the rods shown are jointed rods, in which the sections are separately formed and fitted into one another, it will be understood that the features of the present invention are applicable to single-piece rods, and that the term "section" is intended to refer not only to separable sections but also is intended to refer to the corresponding portions of a one-piece rod.

I claim:

1. A tubular exteriorly tapered metallic fishing rod characterized by the fact that different portions of the rod are progressively reduced in wall thickness by differing ratios from the butt end toward the tip end.

2. A tubular exteriorly tapered metallic fishing rod characterized by the fact that different portions of the rod are progressively reduced in wall thickness by differing ratios from the butt end toward the tip end, and in which different portions of the rod exteriorly taper in conformity with varying ratios.

3. A tubular exteriorly tapered continuous-walled metallic fishing rod characterized by the fact that different portions of the rod are progressively reduced in wall thickness by differing ratios from the butt end toward the tip end.

4. A tubular exteriorly tapered continuous-walled metallic fishing rod characterized by the fact that different portions of the rod are progressively reduced in wall thickness by differing ratios from the butt end toward the tip end, and in which different portions of the rod exteriorly taper in conformity with varying ratios.

5. A tubular exteriorly tapered metallic fishing rod characterized by the fact that different portions of the rod are progressively reduced in wall thickness by differing ratios from the butt end toward the tip end, and in which different portions of the rod exteriorly taper in conformity with varying ratios, the ratio of tapering being lesser in the region toward the butt end of the rod and greater in the region toward the tip end of the rod.

6. A fishing rod made of tubular metallic separable sections, a plurality of which are exteriorly tapered and wherein a plurality of the sections are of varying wall thickness, the ratio of variation in wall thickness being different in each of the plurality of said sections.

7. A fishing rod made of tubular metallic separable sections, at least one of which is of varying wall thickness, and in which the ratio of variation in wall thickness differs in different portions of the same section.

8. A tubular exteriorly tapered metallic fishing rod characterized by the fact that the bore of the rod is tapered from the butt toward the tip in less degree than the exterior, with a resulting decrease in wall thickness toward the tip region.

CHARLES HEDDON.